(12) United States Patent
Sinton et al.

(10) Patent No.: US 11,391,393 B2
(45) Date of Patent: Jul. 19, 2022

(54) MICROFLUIDIC INJECTION AND MANIFOLD ASSEMBLY

(71) Applicant: INTERFACE FLUIDICS LTD., Calgary (CA)

(72) Inventors: David Sinton, Toronto (CA); Thomas De Haas, Edmonton (CA); Julian Haagsma, Edmonton (CA); Richard Salas Chavez, Toronto (CA); Zhanguang Zhang, Toronto (CA)

(73) Assignee: INTERFACE FLUIDICS LTD, Calgary (CA)

(*) Notice: Subject to any disclaimer, the term of this patent is extended or adjusted under 35 U.S.C. 154(b) by 329 days.

(21) Appl. No.: 16/825,295

(22) Filed: Mar. 20, 2020

(65) Prior Publication Data

US 2020/0309285 A1 Oct. 1, 2020

Related U.S. Application Data

(60) Provisional application No. 62/827,263, filed on Apr. 1, 2019.

(51) Int. Cl.
*F16K 99/00* (2006.01)
*B01L 3/00* (2006.01)
*F16K 37/00* (2006.01)

(52) U.S. Cl.
CPC ...... *F16K 99/0034* (2013.01); *B01L 3/50273* (2013.01); *B01L 3/502738* (2013.01); *F16K 37/0091* (2013.01); *F16K 2099/0084* (2013.01)

(58) Field of Classification Search
CPC ......... B01L 2200/027; B01L 2300/042; B01L 2300/0816; B01L 2400/0478;
(Continued)

(56) References Cited

U.S. PATENT DOCUMENTS 9,488,586 B2   11/2016   He et al.
10,001,435 B1   6/2018   Sinton et al.
(Continued)

FOREIGN PATENT DOCUMENTS

CN   204448038 U   7/2015
CN   107703036 B   6/2020
(Continued)

OTHER PUBLICATIONS

Shih-Chuan Liao, Jing Peng, Michael G. Mauk, Sita Awasthi, Jinzhao Song, Harvey Friedman, Haim H. Bau, and Changchun Liua, "Smart Cup: A minimally-instrumented, Smartphone-Based Point-of-Care Molecular Diagnostic Device" Sens Actuators B Chem. Jun. 28, 2016; 229:232-238.
(Continued)

*Primary Examiner* — Jennifer Wecker
*Assistant Examiner* — Jonathan Bortoli
(74) *Attorney, Agent, or Firm* — ABM Intellectual Property Inc.; Adrienne Bieber McNeil (57) ABSTRACT

A microfluidic injection and manifold assembly includes a microfluidic chip having at least a first fluid port and a second fluid port, and a fluid pathway between the first fluid port and the second fluid port. A manifold has a seat on which the microfluidic chip is received, and at least a first fluid channel. The fluid channel has an external fluid port spaced from the seat and an internal fluid port in the seat and connected in fluid communication with the first fluid port of the microfluidic chip. At least a first injector is secured to the manifold and has a plunger and a drive assembly. The drive assembly is activatable to force the plunger into the external fluid port of the manifold to force fluid from the first fluid channel of the manifold into the fluid pathway of the microfluidic chip.

17 Claims, 7 Drawing Sheets

(58) Field of Classification Search
CPC ........... B01L 3/502715; B01L 3/50273; B01L 3/502738; B01L 9/527; F16K 2099/0084; F16K 37/0091; F16K 99/0034
See application file for complete search history.

(56) References Cited

U.S. PATENT DOCUMENTS

| | | |
|---|---|---|
| 10,801,628 B2 | 10/2020 | Forrest et al. |
| 2006/0063160 A1 | 3/2006 | West et al. |
| 2010/0320748 A1 | 12/2010 | Oever et al. |

FOREIGN PATENT DOCUMENTS

| | | | |
|---|---|---|---|
| EP | 3235568 A1 | 10/2017 | |
| WO | WO-2000/078456 | * 10/2000 | ................ B01L 9/00 |
| WO | 2000078456 A1 | 12/2000 | |
| WO | 2020037398 A1 | 2/2020 | |

OTHER PUBLICATIONS

Extended European Search Report in co-pending European patent application No. 20166507.2, dated Aug. 18, 2020.
DOLOMITE Resealable Chip Interface Data Sheet, https://www.dolomite-microfluidics.com/product/resealable-chip-interface/.
Micronit Microfluidics, Fluid Connect 4515, User Manual.
Samuel Marre, Andrea Adamo, Soubir Basak, Cyril Aymonier, and Klavs F. Jensen; "Design and Packaging of Microreactors for High Pressure and High Temperature Applications"; Ind. Eng. Chem. Res. 2010, 49, 11310-11320.
Xiang Cheng, Matthew D. Ooms, and David Sinton; "Biomass-to-biocrude on a chip via hydrothermal liquefaction of algae"; Lab Chip, 2016, 16, 256-260.

* cited by examiner

MICROFLUIDIC INJECTION AND MANIFOLD ASSEMBLY

CROSS REFERENCES TO RELATED APPLICATIONS

This patent application claims the benefit of and/or priority from U.S. Provisional Patent Application No. 62/827,263, filed on Apr. 1, 2019, the entire contents of which are incorporated herein by reference.

TECHNICAL FIELD

This document relates to microfluidics. More specifically, this document relates to microfluidic injection and manifold assemblies, and related kits and methods.

SUMMARY

The following summary is intended to introduce the reader to various aspects of the detailed description, but not to define or delimit any invention.

Microfluidic injection and manifold assemblies are disclosed. According to some aspects, a microfluidic injection and manifold assembly includes a microfluidic chip having at least a first fluid port and a second fluid port, and a fluid pathway between the first fluid port and the second fluid port. The assembly further includes a manifold having a seat on which the microfluidic chip is received, and at least a first fluid channel. The first fluid channel has an external fluid port spaced from the seat and an internal fluid port in the seat and connected in fluid communication with the first fluid port of the microfluidic chip. At least a first injector is secured to the manifold and has a plunger and a drive assembly. The drive assembly is activatable to force the plunger into the external fluid port of the manifold to force fluid from the first fluid channel of the manifold into the fluid pathway of the microfluidic chip.

In some examples, the manifold further includes a second fluid channel. The second fluid channel can have a second external fluid port spaced from the seat and a second internal fluid port in the seat and connectable in fluid communication with the second fluid port of the microfluidic chip. The assembly can further include a second injector secured to the manifold and having a second plunger and a second drive assembly. The second plunger can be received in the second fluid channel and the second drive assembly can be activatable to retract the second plunger from the second fluid channel as the fluid is forced through the fluid pathway.

In some examples, the manifold has a first mounting face defining the external fluid port, and the first injector has an injector mounting face that abuts the first mounting face. In some examples, the manifold has at least a first screw hole extending inwardly from the first mounting face, and the injector is screwed to the manifold via the first screw-hole.

In some examples, the assembly further includes a cover mounted to the manifold over the microfluidic chip for retaining the microfluidic chip on the seat.

In some examples, the manifold further includes at least a first pressure measurement port in fluid communication with the first fluid channel. The assembly can further include a flow-through pressure sensor in fluid communication with the first pressure measurement port for measuring pressure in the first fluid channel, and a valve for selectively preventing or permitting fluid flow through the pressure sensor.

In some examples, the manifold further includes an internal valve within the first fluid channel. The first pressure measurement port can be connected to the first fluid channel between the first internal valve and the external fluid port.

Kits of parts for a microfluidic injection and manifold assembly are also disclosed. According to some aspects, a kit of parts for a microfluidic injection and manifold assembly includes a manifold having a seat for a microfluidic chip, and at least a first fluid channel. The first fluid channel has an external fluid port spaced from the seat and an internal fluid port in the seat. At least a first injector is securable to the manifold and has a plunger and a drive assembly. The drive assembly is activatable to force the plunger into the external fluid port of the manifold to force fluid from the first fluid channel of the manifold.

In some examples, the manifold further includes a second fluid channel. The second fluid channel can have a second external fluid port spaced from the seat and a second internal fluid port in the seat. The assembly can further include a second injector securable to the manifold and having a second plunger and a second drive assembly. The second plunger can be receivable in the second fluid channel and the second drive assembly can be activatable to retract the second plunger from the second fluid channel.

In some examples, the manifold has a first mounting face defining the external fluid port, and the first injector has an injector mounting face for abutting the first mounting face. The manifold can have at least a first screw hole extending inwardly from the first mounting face, and the injector can be securable to the manifold via the first screw-hole.

In some examples, the manifold further includes at least a first pressure measurement port in fluid communication with the first fluid channel. The kit of parts can further include a flow-through pressure sensor connectable in fluid communication with the first pressure measurement port for measuring pressure in the first fluid channel, and a valve connectable to selectively prevent or permit fluid flow through the pressure sensor.

In some examples, the kit of parts further includes an internal valve positionable within the first fluid channel. The first pressure measurement port can be connected to the first fluid channel between the first internal valve and the external fluid port.

Methods for operating a microfluidic injection and manifold assembly are also disclosed. According to some aspects, a method for operating a microfluidic injection and manifold assembly includes a. forcing a plunger into a manifold to force fluid from a fluid channel of the manifold into and through a fluid pathway of a microfluidic chip received by the manifold.

In some examples, the method further includes, prior to step a., securing an injector to the manifold. The injector can include a drive assembly and the plunger. Step a. can include actuating the drive assembly to force the plunger into the fluid channel of the manifold.

In some examples, the method further includes, concurrently with step a., retracting another plunger from another fluid channel of the manifold, to force fluid from the fluid pathway of the microfluidic chip into the other fluid channel.

In some examples, the method further includes flowing fluid into the fluid channel via a pressure sensor and pressure measurement port in the manifold.

In some examples, step a. includes forcing the fluid through a valve in the fluid channel.

In some examples, the method further includes, during step a., viewing the microfluidic chip using an optical imaging system.

Manifolds for a microfluidic chip are also disclosed. According to some aspects, a manifold for a microfluidic chip includes a block having a seat for a microfluidic chip and a set of mounting faces. A set of fluid channels extends through the block. Each fluid channel has an external fluid port in a respective one of the mounting faces, and an internal fluid port in the seat. The block includes a set of pressure measurement ports. Each pressure measurement port is in fluid communication with a respective one of the fluid channels.

In some examples, the manifold further includes a set of valves. Each valve can be positioned in a respective one of the fluid channels, between the pressure measurement port and the internal fluid port.

In some examples, the mounting faces are spaced apart and angled away from each other.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by this document. Any subject matter described below and for which an exclusive right is not granted by this document may be the subject matter of another protective instrument, for example, a continuing patent application, and the applicants, inventors or owners do not intend to abandon, disclaim or dedicate to the public any such subject matter by its disclosure in this document.

Generally disclosed herein is a microfluidic injection and manifold assembly, and related kits, parts, and methods. The assembly can include a manifold for holding a microfluidic chip and for directing fluid into and out of the microfluidic chip. The assembly can further include one or more injectors (which can in some examples be referred to as "pumps"), which can inject fluid into the manifold and through the microfluidic chip or withdraw fluid from the manifold and the microfluidic chip. The injectors can be mounted directly to the manifold—that is, the assembly does not necessarily require tubing or other conduits between the injectors and the manifold. For example, the injectors can each include a plunger, which can be plunged directly into a fluid channel (otherwise referred to as a fluid chamber) of the manifold, to force fluid through the manifold and into and through the microfluidic chip. This can allow for ease of use (e.g. because cleaning of tubing may not be required), as well as for a relatively compact assembly.

The assembly can be used in various types of microfluidic processes and with various types of microfluidic chips, but may be particularly useful in microfluidic research involving the modelling of subterranean formations (e.g. oil-bearing shale formations).

The assembly can optionally be operated at high pressures (e.g. pressures of 320 bar or higher).

Figure 1:
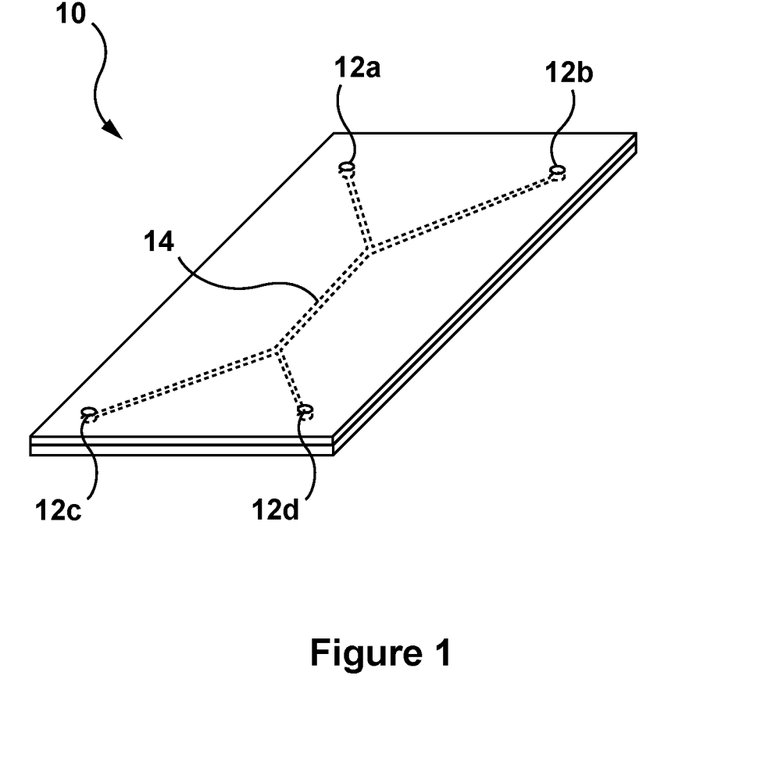
FIG. 1 is a perspective view of an example microfluidic chip.

Various microfluidic chips can be used in the assemblies described herein, and for simplicity, microfluidic chips are not described in detail herein. Briefly, referring to FIG. 1, an example microfluidic chip 10 is shown that includes a set of fluid ports (i.e. a first fluid port 12$a$, a second fluid port 12$b$, a third fluid port 12$c$, and a fourth fluid port 12$d$), and a fluid pathway 14 (shown in dotted line) in fluid communication with and extending between the fluid ports 12$a$-12$d$. The fluid pathway 14 can optionally model a subterranean oil or shale bearing formation. Fluid can enter and/or exit the microfluidic chip 10 via the fluid ports 12$a$-12$d$, and flow through the microfluidic chip 10 via the fluid pathway 14. In alternative examples, the microfluidic chip can include another number of fluid ports (e.g. two fluid ports).

Figure 2:
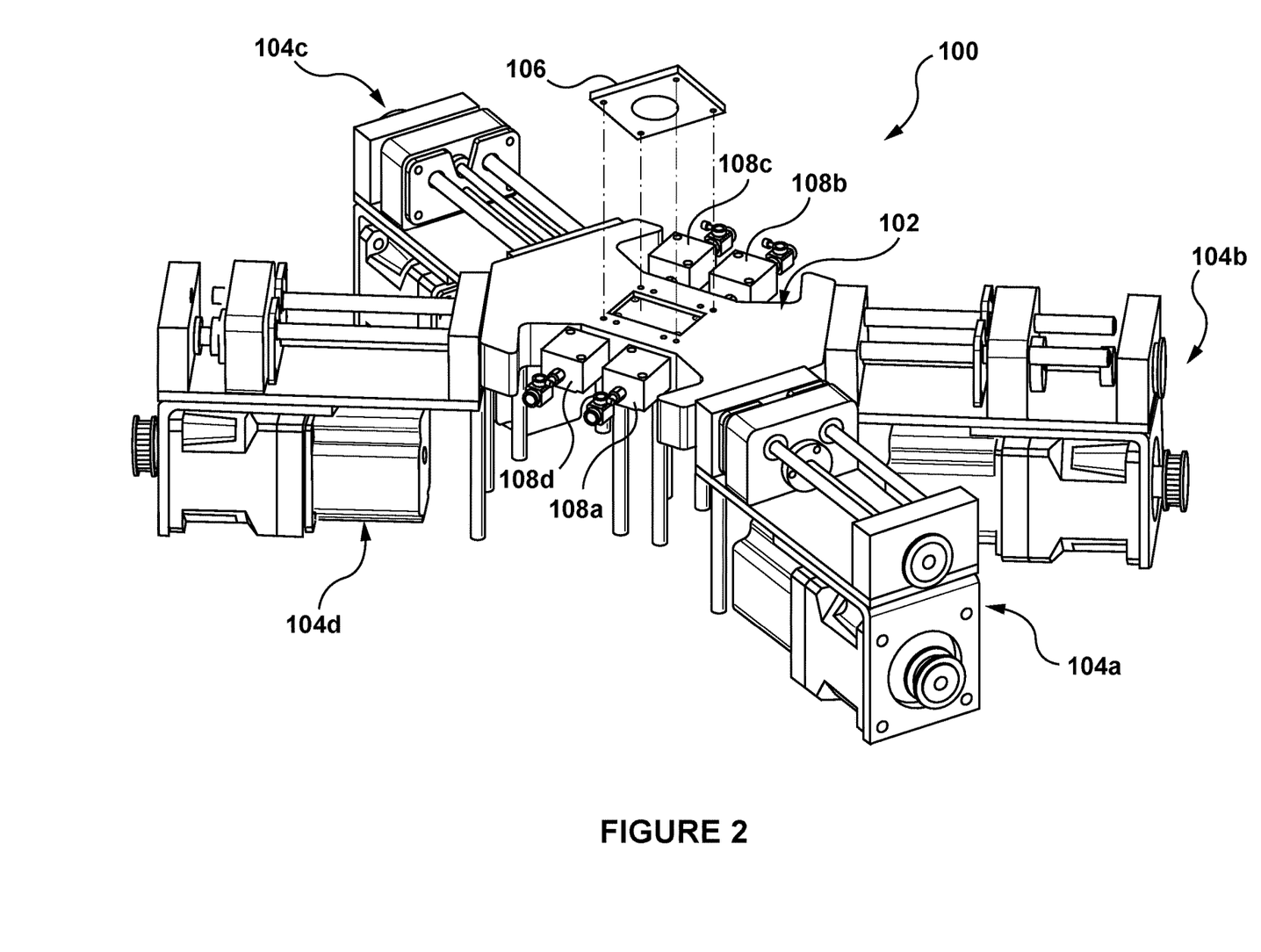
FIG. 2 is a perspective view of an example microfluidic injection and manifold assembly, with a cover of the assembly shown removed from the manifold.

Referring now to FIG. 2, an example of a microfluidic injection and manifold assembly 100 is shown. In the example shown, the assembly 100 includes a manifold 102 (shown in greater detail in FIGS. 3 to 7), and four injectors (namely a first injector 104$a$, a second injector 104$b$, a third injector 104$c$, and a fourth injector 104$d$). The assembly further includes a cover 106, four pressure sensors (namely a first pressure sensor 108$a$, a second pressure sensor 108$b$, a third pressure sensor 108$c$, and a fourth pressure sensor 108$d$), and various other optional accessories.

Referring now to FIGS. 3 to 7, the manifold 102 is shown in greater detail. In the example shown, the manifold 102 is a solid metal block (e.g. a block of aluminum, titanium, or steel). In alternative examples, the manifold can be made from another material. The manifold has an outward facing surface 110, which has a seat 112 for receiving microfluidic chip (e.g. microfluidic chip 10). In the example shown, the seat 112 is defined by a recess in the outward facing surface 110, in which the microfluidic chip 10 can be nested. In alternative examples, the seat can be of another configuration. For example, the seat can be a non-recessed portion of the outward-facing surface, upon which the microfluidic chip 10 can rest.

The cover 106 (shown in FIG. 1) can be mounted to the manifold 102 over the seat 112, to retain the microfluidic chip 10 on the seat 112. In the example shown, the manifold 102 includes screw ports 114 (only one of which is labelled in the Figures) that can allow for the cover 106 to be screwed to the manifold 102. In the example shown, the manifold 102 provides for fluid flow to and from the fluid ports of the microfluidic chip 10 (optionally at high pressure), while the cover 106 allows for analytical access (e.g. optical access) to the microfluidic chip 10.

The cover can be of various alternative configurations, and can mount to the manifold in various alternative ways, including as described in international patent application publication no. WO 2020/037398 (De Haas et al.).

Figure 3:
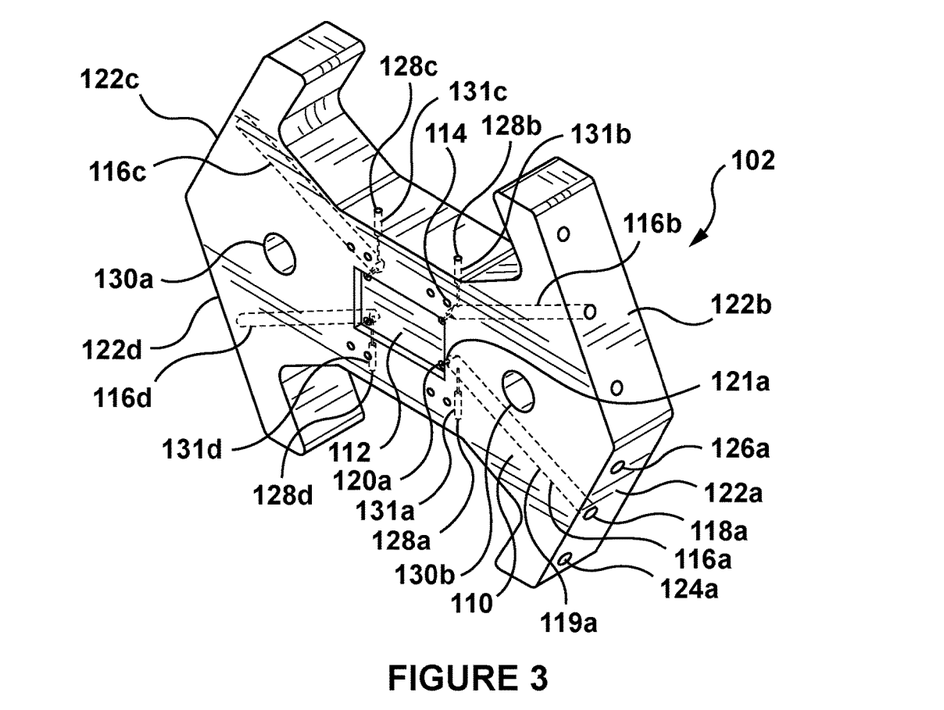
FIG. 3 is a perspective view of the manifold of the assembly of FIG. 2, with various fluid ports and fluid channels shown in dotted line.
Figures 4, 5:
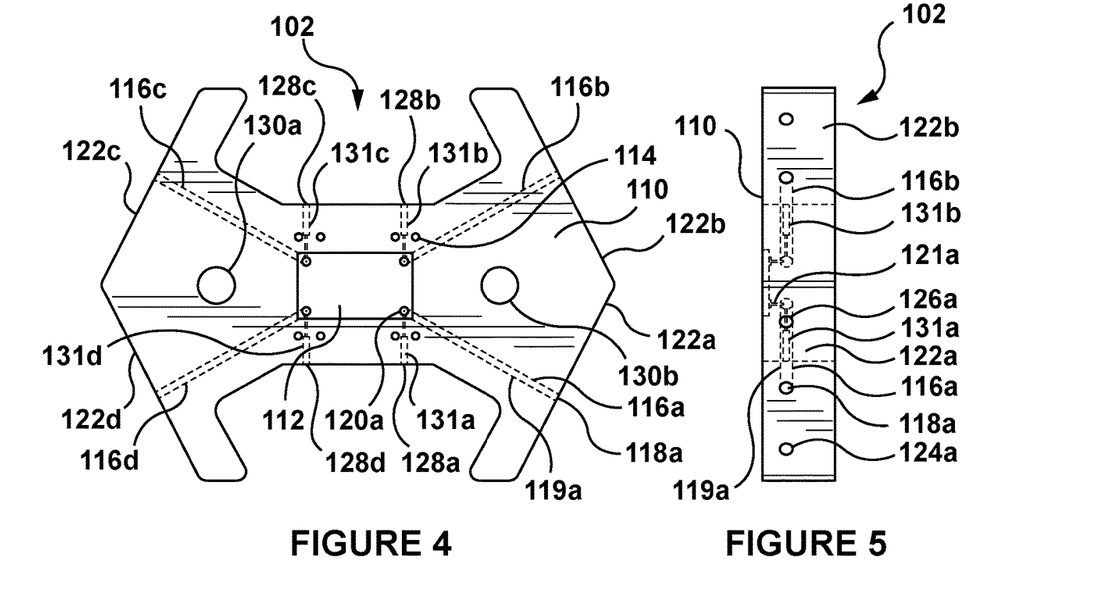
FIG. 4 is a top view of the manifold of FIG. 3, with various fluid ports and fluid channels shown in dotted line.
FIG. 5 is a side view of the manifold of FIG. 3, with various fluid ports and fluid channels shown in dotted line.

Referring still to FIGS. 3 to 5, in the example shown, the manifold 102 includes various fluid channels (shown in dotted line in FIGS. 3 to 5) for routing fluids to and from the microfluidic chip 10, and which can be connected in fluid communication with the fluid ports of the microfluidic chip 10. Specifically, the manifold 102 includes four fluid channels (namely a first fluid channel 116a, a second fluid channel 116b, a third fluid channel 116c, and a fourth fluid channel 116d) that extend through the manifold, each of which can be connected to a respective fluid port (12a-12d) of the microfluidic chip 10 to supply fluid to the microfluidic chip 10 or direct fluid out of the microfluidic chip 10.

In the example shown, the fluid channels 116a-116d include bores that are machined into the manifold. In alternative examples, the fluid channels can be formed in separate pieces of material, which are then secured to the body of the manifold.

The first fluid channel 116a will now be described in greater detail. The second 116b, third 116c, and fourth 116d fluid channels are similar to the first fluid channel 116a, and will not be described in detail. In this document, the features of the first fluid channel 116a may be referred to with the prefix "first". Similar features of the second, third, and fourth fluid channels may be referred to with the same nomenclature, but with the prefixes second, third, and fourth, respectively. Furthermore, the reference numerals for the features of the first fluid channel may be appended with the suffix 'a'. Similar features of the second through fourth fluid channels may be referred to with the same reference numerals, but appended with the suffixes 'b', 'c', and 'd', respectively.

Referring to FIGS. 3 to 5, the first fluid channel 116a has a pair of fluid ports, including an external fluid port 118a that is spaced from the seat for connection to the first injector 104a, and an internal fluid port 120a in the seat 112 for connection to one of the fluid ports 12a-12d of the microfluidic chip 10. The internal fluid port 120a can be surrounded by an o-ring (not shown) that is positioned in the seat 112. In use, the microfluidic chip 10 can bear against the o-ring to form a sealed connection between the internal fluid port 120a of the manifold and the fluid port 12a of the microfluidic chip 10.

Referring still to FIGS. 3 to 5, in the example shown, the manifold 102 includes a first mounting face 122a, and the external fluid port 118a is defined in the first mounting face 122a. The first fluid channel 116a includes a horizontal section 119a that extends inwardly and linearly from the first mounting face 122a, and a vertical section 121a (shown most clearly in FIG. 5) that extends upwardly from the horizontal section 119a towards the seat 112 and ends at internal fluid port 120a (the terms 'horizontal' and 'vertical' are used for simplicity, with reference to the orientation of the assembly 100 shown in FIG. 2; however, the assembly 100 is not limited to use in this orientation). In use, the first mounting face 122a can abut and be secured to the first injector 104a, so that the first injector 104a can access the external fluid port 118a. In the example shown, the first mounting face includes a pair of screw-holes 124a, 126a, and the injector 104a can be screwed to the first mounting face 122a via the screw holes 124a, 126a.

In the example shown, the manifold 102 further includes second 122b, third 122c, and fourth 122d mounting faces, which are of a similar configuration to the first mounting face 122a (and which for simplicity are not described in detail). In the example shown, the first 122a, second 122b, third 122c, and fourth 122d mounting faces are spaced apart from each other and angled away from each other, to allow for space for the injectors 104a-104d to be mounted to the mounting faces 122a-122d.

In alternative examples, the manifold can include another number of fluid channels (i.e. at least one fluid channel).

In the example shown, the manifold 102 further includes a set of pressure measurement ports (also referred to herein as a first pressure measurement 128a, a second pressure measurement port 128b, a third pressure measurement port 128c, and a fourth pressure measurement port 128d). The pressure measurement ports 128a-128d are in fluid communication with the fluid channels 116a-116d, respectively, via pressure measurement channels 131a-131d in the manifold 102 that extend between the pressure measurement ports 128a-128d and the fluid channels 116a-116d, respectively. Pressure sensors 108a-d (shown in FIG. 2) may be mounted to the pressure measurement ports, to monitor the pressure of the fluid entering and exiting the microfluidic chip 10. In the example shown, the pressure sensors 108a-d are flow-through pressure sensors. As will be described below, the pressure measurement ports can also be used to inject fluid into the manifold, via the pressure sensors 108a-d and via valves associated with the pressure measurement ports (i.e. a first valve 136a, a second valve 136b, a third valve 136c, and a fourth valve 136d, shown in FIG. 10, which can collectively be referred to as a first set of valves).

Figure 6:
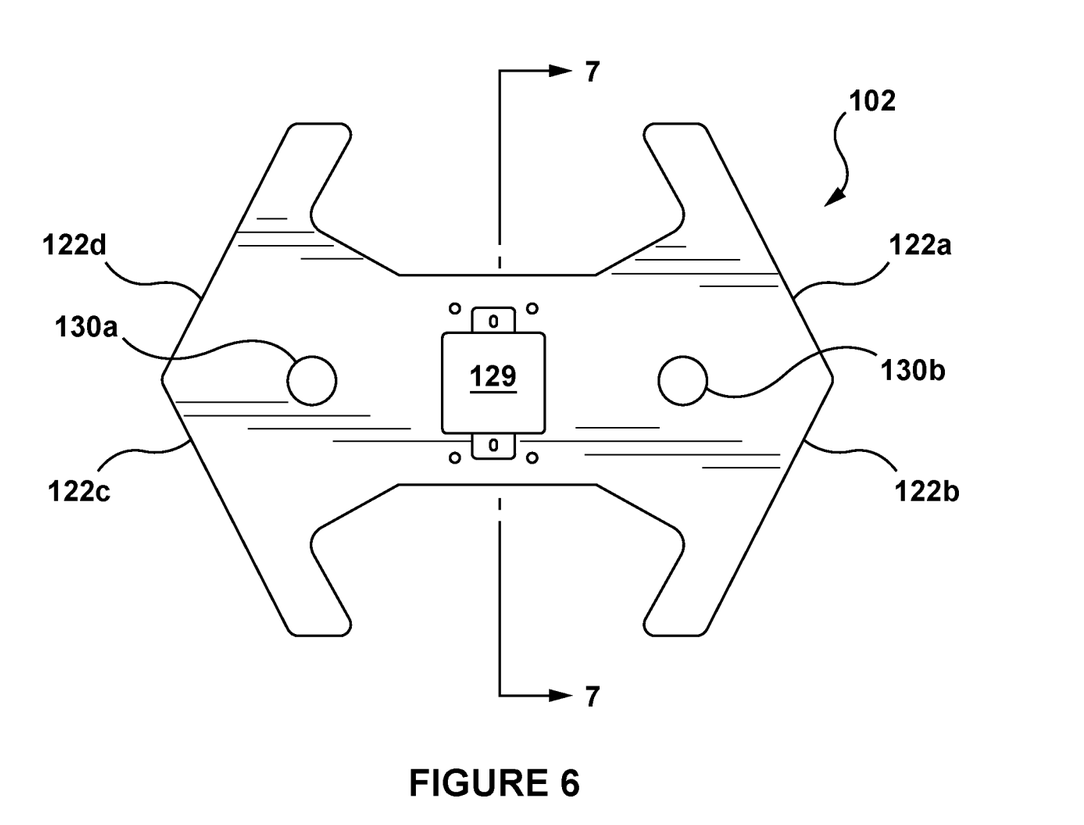
FIG. 6 is a bottom view of the manifold of FIG. 3.
Figure 7:
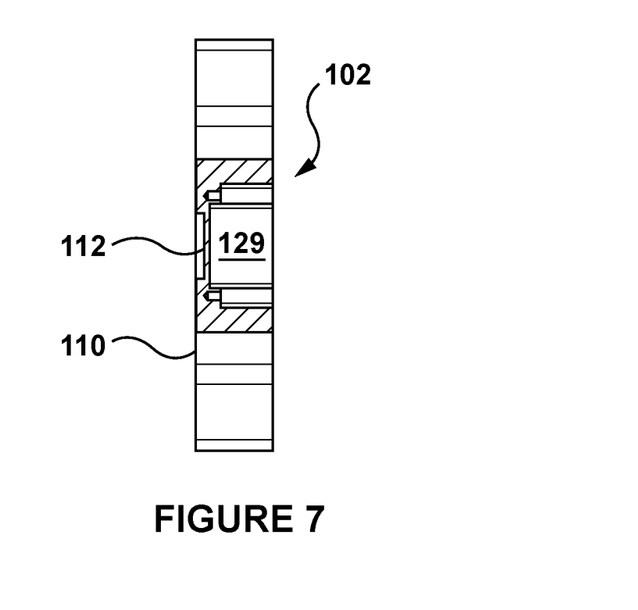
FIG. 7 is a cross-section taken along line 7-7 in FIG. 6.

Referring to FIGS. 6 and 7, in the example shown, the manifold 102 further includes a space 129 below the seat 112 for receiving a heating or cooling apparatus (not shown), for controlling the temperature of the microfluidic chip 10. The heating or cooling apparatus can be, for example, a water block, a resistive heater (e.g. a cartridge heater, band heater, and/or a silicone pad/mat heater), and/or a Peltier heater/cooler. In alternative examples, the manifold can include one or more additional heating or cooling apparatuses. Furthermore, the assembly can optionally include a temperature sensor (not shown) for measuring the temperature of the manifold and/or the chip 10. The temperature sensor can be, for example, a thermocouple or a resistance temperature detector.

Referring back to FIGS. 3 and 4 In the example shown, the manifold 102 further includes mounting holes 130a, 130b. Mounting holes 130a and 130b can be used for connecting the manifold 102 to an analytical system (e.g. a microscope).

The first injector 104a will now be described in detail. In this document, features of the first 104a injector may be referred to with the prefix "first", and reference numerals for such features may include the suffix "a". The remaining injectors 140b-104d are similar to the first injector 104a, and are therefore not described in detail. However, features of the second 104b, third 104c, and fourth 104d injectors may referred to with the same nomenclature as the features of the first injector 104a, but with the prefixes "second", "third", and "fourth", respectively. In addition, reference numerals for the features of the second 104b, third 104c, and fourth 104d injectors may be the same as the reference numerals for the features of the first injector 104a, but may include the suffixes "b", "c", and "d", respectively.

Figure 8:
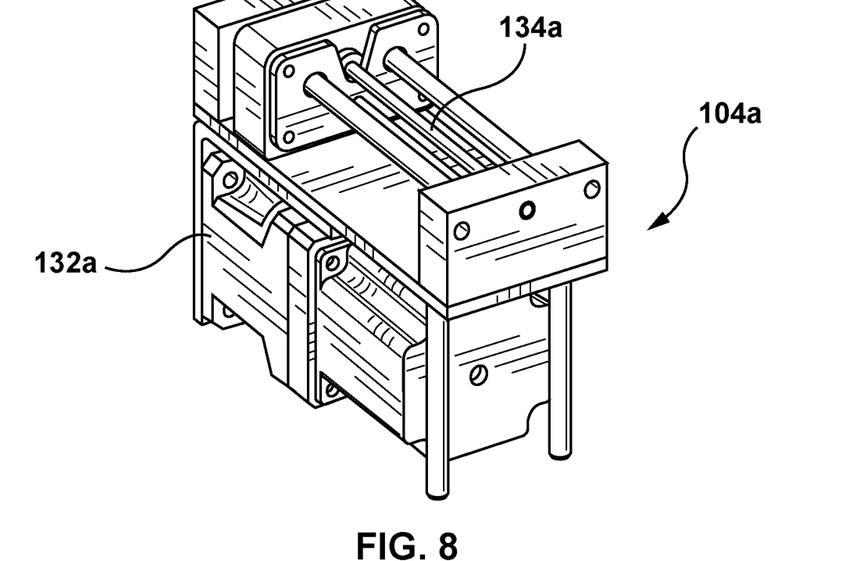
FIG. 8 is a perspective view of one of the injectors of the assembly of FIG. 2.
Figure 9:
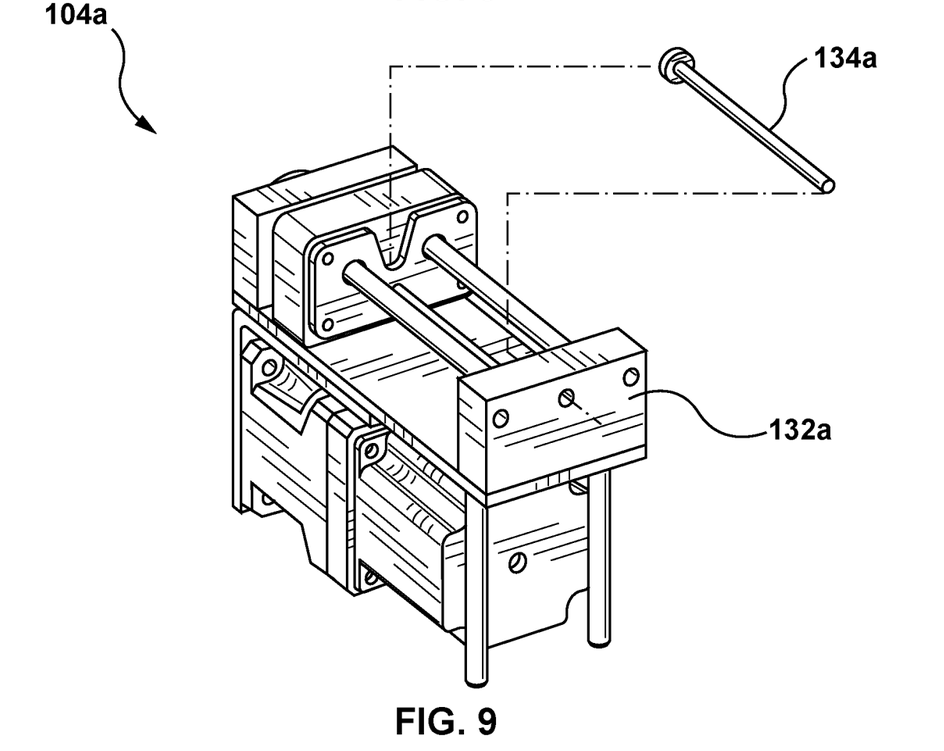
FIG. 9 is an exploded view of the injector of FIG. 8.

Referring now to FIGS. 8 and 9, in the example shown, the first injector 104a includes a first drive assembly 132a, and a first plunger 134a. The first drive assembly 132a is activatable to force the first plunger 134a outwardly from the first injector 104a, or to retract the first plunger 134a inwardly towards the first injector 104a. The first plunger 134a is shown in a retracted configuration in FIG. 8. The distal end of the first plunger 134a can include a seal (not shown), for sealing the fluid channels of the manifold 102 in use (as will be described below).

The first drive assembly 132a can be of any suitable configuration that can force the first plunger 134a outwardly and/or inwardly. In the example shown, the first drive assembly 132a is motorized, and can be controlled by a computer to move the first plunger 134a in a controlled fashion, to force controlled amounts of fluid through the microfluidic chip 10. In alternative examples, the drive assembly can manually operated and controlled.

Figure 10:
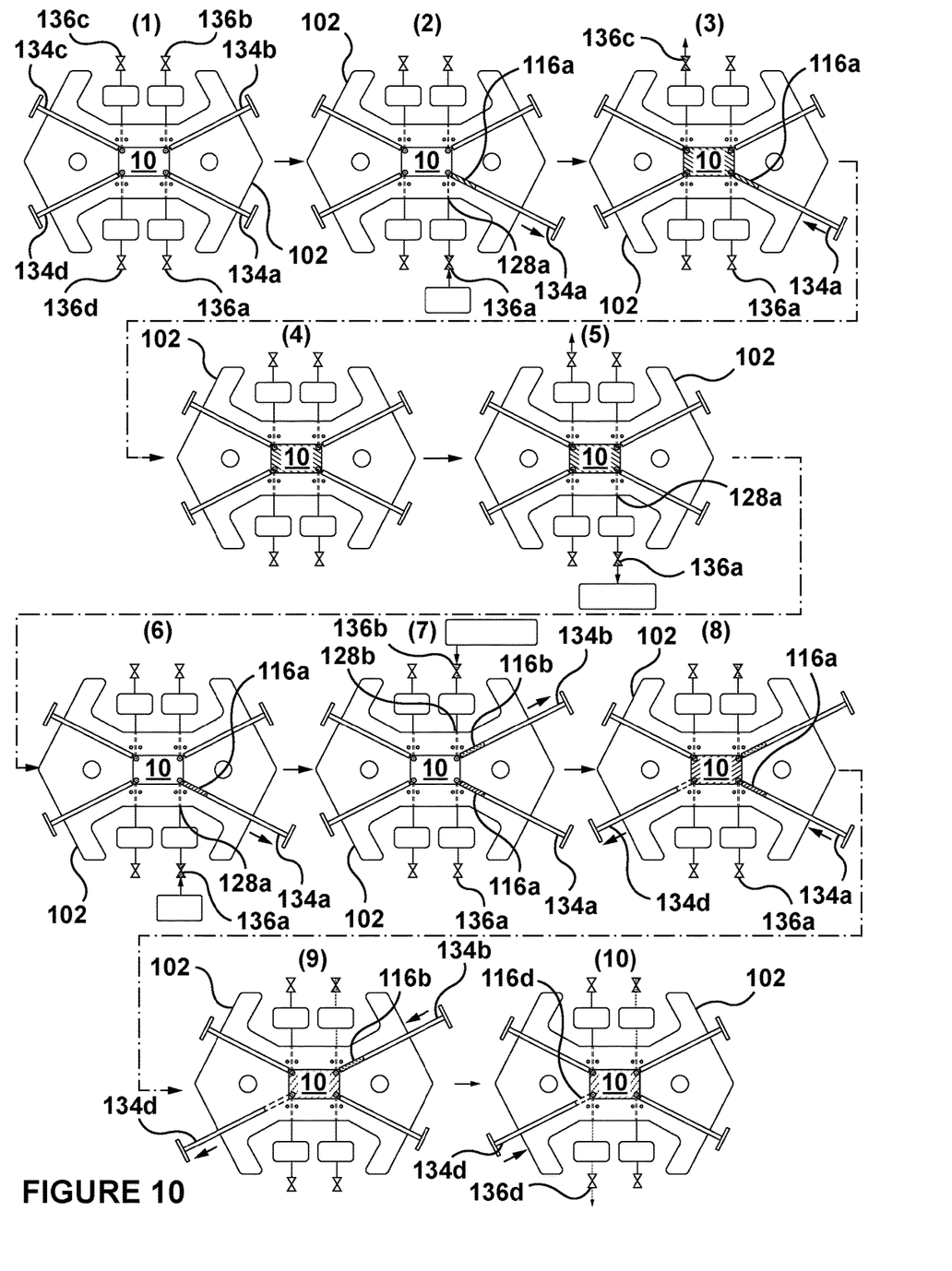
FIG. 10 is a schematic drawing showing an example of the operation of the assembly of FIG. 2.

An example of the operation of the assembly 100 will be described below with reference to FIG. 10. For simplicity, only the plungers 134a-134d of the injectors 104a-104 are shown in FIG. 10 (i.e. the drive assemblies 132-132b are not shown). At the start of the process (i.e. at step 1 in FIG. 10), the assembly 100 can be configured as shown in FIG. 2, with the first 104a, second 104b, third 104c, and fourth 104d injectors positioned against and secured to the first 122a, second 122b, third 122c, and fourth 122d mounting faces, respectively, of the manifold 102. When the injectors 104a-d and the manifold 102 are secured together, each plunger 134a-d is aligned with a flow channel of the manifold (i.e. the first plunger 134a of the first injector 104a is aligned with the horizontal section of the first fluid channel 116a, the second plunger 134b of the second injector 104b is aligned with the horizontal section of the second fluid channel 116b, and so on). Furthermore, at the start of the process, the microfluidic chip 10 can be received on the seat 112 (not shown in FIG. 10) so that the fluid ports 12a-12d are in fluid communication with the fluid channels 116a-116d, respectively. The cover 106 (not shown in FIG. 10) can be secured over the chip 10.

Referring now to FIG. 10, at the start of the process (step 1), each plunger 134a-134d can be in the outward configuration, so that the first plunger 134a is received in the horizontal section 119a of the first fluid channel 116a (not visible in FIG. 10, step 1), the second plunger 104b is received in the horizontal section of the second fluid channel 116b (not visible in FIG. 10, step 1), and so on. At step 2, the first fluid channel 116a can be filled, for example with brine. This can be done by opening the first valve 136a and injecting the brine into the manifold 102 via the first pressure measurement port 128a, while retracting the first plunger 134a. At step 3, the chip 10 can be filled with brine, by opening the third valve 136c and closing the first valve 136a, and forcing the first plunger 134a outwardly and into the first fluid channel 116a. At step 4, all valves can be closed, and the chip 10 can be aged. At step 5, the first pressure measurement port 128a can be purged, by opening the first valve 136a and applying a vacuum to the first pressure measurement port. At step 6, the first fluid channel 116a can be filled with oil (e.g. oil from a formation to be modelled), by opening the first valve 136a and injecting the oil into the manifold 102 via the first pressure measurement port 128a, while retracting the first plunger 134a. At step 7, the second fluid channel 116b can be filled with a test fluid (e.g. a surfactant) by closing the first valve 136a and opening the second valve 136b, and injecting the test fluid into the manifold 102 via the second pressure measurement port 128b and retracting the second plunger 134b. At step 8, the chip 10 can be filled with oil by closing all valves, and forcing the first plunger 134a into the horizontal section of the first fluid channel 116a while retracting the fourth plunger 134d. At step 9, the surfactant can be added to the chip 10, by closing all valves, and forcing the second plunger 134b into the horizontal section of the second fluid channel 116b while further retracting the fourth plunger 134d. Finally, at step 10, the chip 10 and fourth fluid channel 116d can be emptied, by opening the fourth valve 136d and forcing the fourth plunger 134d into the horizontal section of the fourth fluid channel 116d. During the above steps, the chip 10 can be viewed (e.g. with an optical imaging system), to collect data regarding the flow of the various fluids through the chip 10.

Figure 11:
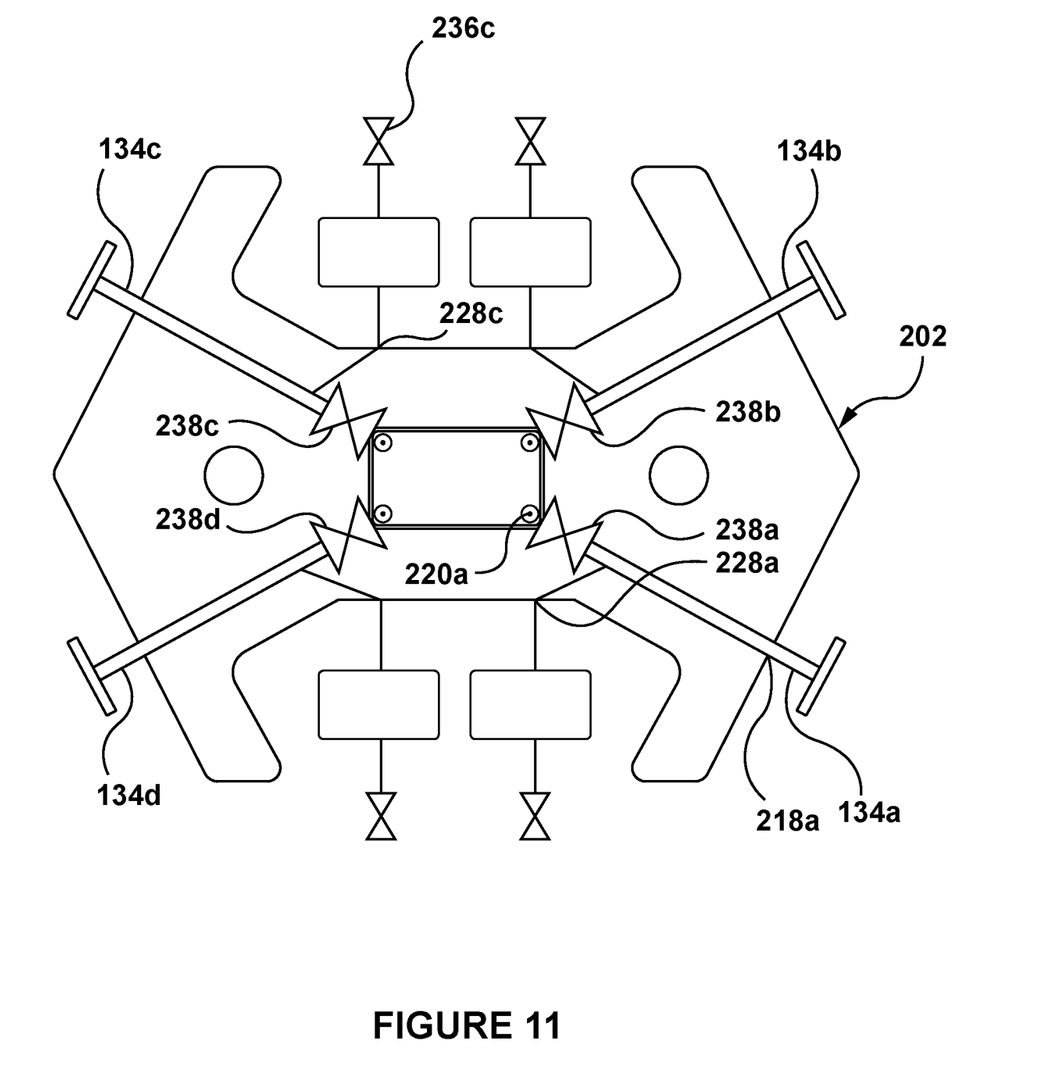
FIG. 11 is a top schematic view of another example manifold, also showing the plungers of the injectors.

Referring now to FIG. 11, another manifold 202 is schematically shown. The manifold 202 is similar to the manifold 102, and features of the manifold 202 that are similar features to the features of the manifold 102 will be referred to with similar reference numerals, incremented by 100. The manifold 202 can be used with the same injectors 104a-104d described above. For simplicity, only the plungers 134a-134d of the injectors 104a-104d are shown in FIG. 11.

In the example shown, the manifold 202 includes a second set of valves, which are internal to the manifold 202. The second set of valves includes a first internal valve 238a in the first fluid channel (not shown), a second internal valve 238b in the second fluid channel (not shown), a third internal valve 238c in the third fluid channel (not shown), and a fourth internal valve 238d in the fourth fluid channel (not shown). The first internal valve 238a is positioned adjacent the internal fluid port 220a of the first fluid channel, between the internal fluid port 220a and the external fluid port 218a. The first pressure measurement port 228a connects to the first fluid channel between the first internal valve 238a and the external fluid port 218a.

An example of the operation of the manifold 202 will now be briefly described. In use, the first and second fluid channels can be filled as described above (e.g. with brine or surfactant or oil), via the first pressure measurement port 228a. The third valve 236c and the third internal valve 238c can then be opened, and a vacuum can be applied to the third pressure measurement port 228c, to apply a vacuum to the chip 10. The third valve 236c can then be closed. The first 238a and second 238b internal valves can then be opened, and the first 234a and second 234b plungers can be forced outwardly from the injectors, to force the fluid in the first and second fluid channels and into the microfluidic chip 10.

In the examples above, the plungers of the injectors are forced outwardly from the injectors into the fluid channels of the manifold. In alternative examples, the plungers can remain outboard of the fluid channels in use. For example, each injector can include a barrel for holding fluid, as well as a plunger. The injectors can be mounted to the manifold, so that each barrel is in sealed fluid communication with one of the fluid channels. The plungers can be advanced through the barrels, to force fluid from the barrels into the fluid channels of the microfluidic chip 10.

In any of the above examples, the various parts of the assembly (e.g. the manifold, injectors, and microfluidic chip) can be sold or provided together or separately. Furthermore, the various parts of the assembly can be sold or provided in an assembled configuration, or as a kit of parts to be assembled together.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A microfluidic injection and manifold assembly comprising:
    a microfluidic chip having at least a first fluid port and a second fluid port, and a fluid pathway between the first fluid port and the second fluid port;
    a manifold having a seat on which the microfluidic chip is received, at least a first fluid channel, wherein the first fluid channel has an external fluid port spaced from the seat and an internal fluid port in the seat and connected in fluid communication with the first fluid port of the microfluidic chip, and at least a first pressure measurement port in fluid communication with the first fluid channel;
    at least a first injector secured to the manifold and having a plunger and a drive assembly, wherein the drive assembly is configured to force the plunger into the external fluid port of the manifold to force fluid from the first fluid channel of the manifold into the fluid pathway of the microfluidic chip; and
    a flow-through pressure sensor, in fluid communication with the first pressure measurement port, and configured for measuring pressure in the first fluid channel, and a valve configured for selectively preventing or permitting fluid flow through the pressure sensor.

2. The microfluidic injection and manifold assembly of claim 1, wherein:
    the manifold further comprises a second fluid channel, wherein the second fluid channel has a second external fluid port spaced from the seat and a second internal fluid port in the seat and connectable in fluid communication with the second fluid port of the microfluidic chip; and
    the assembly further comprises a second injector secured to the manifold and having a second plunger and a second drive assembly, wherein the second plunger is received in the second fluid channel and the second drive assembly is configured to retract the second plunger from the second fluid channel as the fluid is forced through the fluid pathway.

3. The microfluidic injection and manifold assembly of claim 1, wherein the manifold has a first mounting face defining the external fluid port, and the first injector has an injector mounting face that abuts the first mounting face.

4. The microfluidic injection and manifold assembly of claim 3, wherein the manifold has at least a first screw hole extending inwardly from the first mounting face, and the injector is screwed to the manifold via the first screw-hole.

5. The microfluidic injection and manifold assembly of claim 1, further comprising a cover mounted to the manifold over the microfluidic chip for retaining the microfluidic chip on the seat.

6. The microfluidic injection and manifold assembly of claim 1, wherein the manifold further comprises an internal valve within the first fluid channel.

7. The microfluidic injection and manifold assembly of claim 6, wherein first pressure measurement port is connected to the first fluid channel between the first internal valve and the external fluid port.

8. A kit of parts for a microfluidic injection and manifold assembly comprising:
    a manifold having a seat for a microfluidic chip, at least a first fluid channel, wherein the first fluid channel has an external fluid port spaced from the seat and an internal fluid port in the seat, and at least a first pressure measurement port in fluid communication with the first fluid channel;
    at least a first injector secured to the manifold and having a plunger and a drive assembly, wherein the drive assembly is configured to force the plunger into the external fluid port of the manifold to force fluid from the first fluid channel of the manifold; and
    a flow-through pressure sensor connectable in fluid communication with the first pressure measurement port, and configured for measuring pressure in the first fluid channel, and a valve connected to the first measurement port and configured to selectively prevent or permit fluid flow through the pressure sensor.

9. The kit of parts of claim 8, wherein:
    the manifold further comprises a second fluid channel, wherein the second fluid channel has a second external fluid port spaced from the seat and a second internal fluid port in the seat; and
    the assembly further comprises a second injector secured to the manifold and having a second plunger and a second drive assembly, wherein the second plunger is receivable in the second fluid channel and the second drive assembly is configured to retract the second plunger from the second fluid channel.

10. The kit of parts of claim 8, wherein the manifold has a first mounting face defining the external fluid port, and the first injector has an injector mounting face for abutting the first mounting face.

11. The kit of parts of claim 10, wherein the manifold has at least a first screw hole extending inwardly from the first mounting face, and the injector is securable to the manifold via the first screw-hole.

12. The kit of parts of claim 9, further comprising an internal valve positionable within the first fluid channel.

13. The kit of parts of claim 12, wherein first pressure measurement port is connected to the first fluid channel between the first internal valve and the external fluid port.

14. A method for operating a microfluidic injection and manifold assembly, comprising:
    a. forcing a plunger into a manifold to force fluid from a fluid channel of the manifold into and through a fluid pathway of a microfluidic chip received by the manifold, wherein step a. comprises forcing the fluid through a valve in the fluid channel;
    b. flowing fluid into the fluid channel via a flow through pressure sensor and a pressure measurement port in the manifold; and
    c. measuring pressure in the fluid channel using the flow through pressure sensor, wherein the flow through pressure sensor is connected to the pressure measurement port.

15. The method of claim 14, wherein:
    the method further comprises, prior to step a., securing an injector to the manifold, wherein the injector comprises a drive assembly and the plunger; and step a. comprises actuating the drive assembly to force the plunger into the fluid channel of the manifold.

16. The method of claim 14, further comprising, concurrently with step a., retracting another plunger from another fluid channel of the manifold, to force fluid from the fluid pathway of the microfluidic chip into the other fluid channel.

17. The method of claim 14, further comprising, during step a., viewing the microfluidic chip using an optical imaging system.

\* \* \* \* \*